(12) United States Patent
Chang (10) Patent No.: US 7,233,792 B2
(45) Date of Patent: Jun. 19, 2007

(54) PROXIMITY TRIGGERED JOB SCHEDULING SYSTEM AND METHOD

(76) Inventor: Ting-Mao Chang, 2126 Villanova Rd., San Jose, CA (US) 95130

( * ) Notice: Subject to any disclaimer, the term of this patent is extended or adjusted under 35 U.S.C. 154(b) by 0 days.

(21) Appl. No.: 10/507,726

(22) PCT Filed: Mar. 10, 2003

(86) PCT No.: PCT/US03/07833

§ 371 (c)(1),
(2), (4) Date: Sep. 10, 2004

(87) PCT Pub. No.: WO03/079578

PCT Pub. Date: Sep. 25, 2003

(65) Prior Publication Data

US 2005/0144318 A1    Jun. 30, 2005

(51) Int. Cl.
*H04Q 7/20* (2006.01)
(52) U.S. Cl. .................. 455/422.1; 455/41.2; 455/421
(58) Field of Classification Search ............... 455/41.2, 455/421, 422.1, 456.1, 466, 525, 515, 526, 455/404.1, 567, 404.2; 340/573, 689, 575, 340/524, 521; 710/15, 16, 10, 19, 47, 64; 342/257.01; 709/206, 217; 705/26; 707/4
See application file for complete search history.

(56) References Cited

U.S. PATENT DOCUMENTS 5,774,055 A * 6/1998 Pomerantz ............... 340/573.7
6,119,014 A * 9/2000 Alperovich et al. ......... 455/466
6,177,905 B1 * 1/2001 Welch .................... 342/357.13
6,330,447 B1 * 12/2001 Hengeveld .................. 455/436
6,360,101 B1 * 3/2002 Irvin ........................ 455/456.6
6,381,457 B1 * 4/2002 Carlsson et al. ......... 455/435.2
6,414,635 B1 * 7/2002 Stewart et al. ............... 342/457
6,680,909 B1 * 1/2004 Bansal et al. ................ 370/231
6,681,256 B1 * 1/2004 Kuntze et al. ............... 709/236
6,799,054 B2 * 9/2004 Shpak ........................ 455/525
6,819,256 B2 * 11/2004 Hampton .................. 340/691.6
6,842,505 B1 * 1/2005 Suder et al. ............. 379/88.01
6,907,252 B2 * 6/2005 Papadias et al. .......... 455/456.1
2001/0049282 A1 * 12/2001 Ushiki et al. ............... 455/422
2002/0050927 A1 * 5/2002 De Moerloose et al. .... 340/539
2002/0086680 A1 * 7/2002 Hunzinger .................. 455/456
2002/0160769 A1 * 10/2002 Gray ......................... 455/423
2002/0183004 A1 * 12/2002 Fulton et al. .................. 455/41
2003/0005060 A1 * 1/2003 Davidson et al. ........... 709/206
2003/0104820 A1 * 6/2003 Greene et al. .............. 455/456
2004/0110515 A1 * 6/2004 Blumberg et al. ........ 455/456.1
2005/0188090 A1 * 8/2005 Washburn ................... 709/226

* cited by examiner

*Primary Examiner*—Jean Gelin (57) ABSTRACT

A system and method combine mobile computing device (0100), wireless communication interface (0105), and an application program (0108) to provide the mobile computing device user to schedule and execute jobs based on the proximity to peer wireless communication nodes or access points. The scheduler schedules jobs and chooses a proximity relation of presences of one or more identifiers of physical layer or MAC sublayer or data link layer of wireless communication protocol. Execute the job in response to the evaluation result of the proximity relation.

27 Claims, 8 Drawing Sheets

PROXIMITY TRIGGERED JOB SCHEDULING SYSTEM AND METHOD

BACKGROUND

1. Field of Invention

This invention relates to a proximity triggered job scheduling system and method that schedule and execute a proximity triggered job when approach another wireless communication device, such as a wireless base station and a wireless mobile communication device.

2. Description of Prior Art

Many personal digital assistant (PDA) are design to target the mobile user market, such as Palm and Microsoft Pocket PC. These personal digital assistants provide many daily use applications for mobile users, such as schedule, reminder, to-do list warning applications. These applications are sensitive to the time instead of location. For example, the schedule application will notice user when time is close to the scheduled time of an appointment.

U.S. Pat. No. 6,177,905 described a location-triggered reminder for mobile user. The absolute location triggered reminder use a Global Position System (GPS) to position the user's geographic location. Then, user request a remind message when enter a region defined by user's current position and range information given by user. This system requires a positioning system, for example GPS, to be used with the personal digital assistant that will increase the manufacturing cost and battery power consumption. Almost all of these positioning system have limited usage or useless in indoors or tall building shaded down town area.

Some proximity awareness applications use a short-range wireless transmitter to broadcast the identification code. Hummingbird is a mobile device that aims to support awareness between group members who are in the physical vicinity of each other. A Hummingbird needs to periodically broadcast an identification code that is recognized by its group member and scans surrounding for other Hummingbirds of its group member. It tells its user when another group member has been detected. Hummingbird doesn't provide the capability for user to schedule proximity-triggered task. Hummingbird used a proprietary RF transmitter and not does not offer or utilize computer-networking capability, which need to implement at least a data link layer protocol stack to maintain a reliable connection. Therefore, it more like sensor system instead of networking system. The periodic identification broadcasting requirement increase the network traffic and also increase the power consumption in all Hummingbirds in vicinity.

In another category of applications, the awareness relies on network protocol layer such as the network layer, the transport layer, or higher layer defined in Open Systems Interconnection Reference model. The Proem system by Oregon University is a collaborative peer-to-peer application for mobile ad hoc networks. The system defines a transport protocol that is implemented on top of a variety of existing protocol such as TCP/P, UDP, or HTTP. Peer of the system can discover other peers by periodically broadcast request and other peer responses to it. Peer can also periodically announce their presence by broadcasting the name, a Uniform Resource Identifier, of the peer. Proem system need to be installed on every peers to be able to discovery each other. Proem application aware of presence of other user and be able to define rule of encounter such as alerting the user. The awareness capability in this category builds on higher level of communication protocol layer that requires the connection between peers to be established first. However, establishing the connection usually need an authentication process which introduce the inconvenience. Data transmitted after connection usually have encryption. If skip authentication or encryption, it will create the security problem. Relying on high-level communication will cause large amount of data communication, which increase traffic through the wireless network and also increase the power consumption in all mobile devices.

None of the prior art utilizes the media access control (MAC) address or service set identifier in MAC layer frame to detect other nearby wireless communication device and trigger user scheduled tasks, such as reminder, TODO-List, e-mail retrieval, computer system or network login, control other appliances, etc.

Since wireless communication technology becomes mature, many notebook computer, PDA, or mobile communication device are installed with a wireless communication interface module, such as IEEE 802.11 wireless local area network interface or Bluetooth wireless interface module, GSM modem module, etc. Through the wireless connection, mobile user could access information on another computer system or another PDA in the local network area or even the whole Internet for reading email, transferring files, executing a job, or access services. In the future, mobile computing devices will all have the wireless communication capability.

SUMMARY OF THE INVENTION

A proximity triggered job scheduling system and method is provided for mobile user. A proximity triggered job in the preferred embodiment of the present invention contains one or more actions and a trigger condition. Said one or more actions are executed by a mobile computing device when said computing device detects the presence of other nearby wireless communication devices and the presence condition of said detected wireless communication devices matches the trigger condition of said job.

Wireless communication interface (WCI) is used for detecting other wireless communication devices in accordance with the present invention. A WCI usually implement the physical layer and Media Access Control (MAC) sublayer protocol stacks. Said WCI intercepts the message on wireless media and decode one or more identifiers in MAC sublayer or data link layer frame. The identifier, for example, is a transmitter MAC address, receiver MAC address, or SSID in IEEE 802.11 MAC protocol. Each WCI is given a unicast MAC address. Therefore, detecting a unicast MAC address is equal to detecting the WCI designated by said unicast MAC address. Thus, detecting a SSID is equal to detecting a network service set. Each WCI has certain operation range and only the WCIs within the range can send and receive message. Hence, an identifier decoded from MAC sublayer or data link layer designates a nearby WCI within the operation range. Use of the address or identifier in frame of MAC sublayer or data link layer without processing the payload for higher level of protocol speed up the detecting process and minimize the unnecessary user identifier broadcasting, which in turn reduce the power consumption.

In the preferred embodiment of the present invention, a trigger condition is a BOOLEAN condition of the presence of one or more identifier in MAC sublayer protocol or data link layer protocol. For example, "A & B" is the condition that both wireless communication device A and wireless communication device B are present. In another example, "A & !C" is a condition that the wireless communication device A is present but wireless communication device C get lost, i.e. did not detect for a period of time. In another embodiment the trigger condition may be specified in a natural language, for example, "when detect A and lost B". In another embodiment, the identity or address of WCI is given an alias to encapsulate the identity information with more meaningful name such that the alias could also be used in a trigger condition.

In another embodiment of the present invention, the trigger condition of a job could further include other context condition, such as a time condition, which provide by a clock, or a geographic area, which provide by a Global Positioning System. For example, the job will be executed when a PDA of the present invention approaches WCI A at lunchtime. "Lunchtime" could be further defined as 12:00 pm to 1:00 pm every day. The time condition could be complicate, for example at lunchtime of the next two Tuesday. The trigger condition could further specify the occurrences of the job execution. For example, limit the job execution occurrence for three times and remove the job from the schedule after three times of job execution.

An application program in one of the embodiment of the present invention receives a job specification and schedules the job. A job description defines one or more actions that will be executed when a trigger condition is satisfied. The trigger condition describes the condition that the job should be executed in terms of presence of one ore more said identifiers. When an identifier in the trigger condition is detected, the application program exams the trigger condition of scheduled jobs. If the trigger condition of a scheduled job satisfied, said one or more action of the job is executed. In another embodiment, the trigger condition includes the time condition. A scheduled job will be executed only if both the time condition and other proximity condition are satisfied.

In some embodiments, the application program on host system polls the WCI to receive a MAC frame and decode said frame to detect identifier. In another embodiment, WCI performs identifier detection and interrupts said application program on host system to exam said trigger condition if detected identifier is interested to said application program. In yet another embodiment, a power saving scheme is implemented. The host system and WCI can be independently powered down. Said application program stores the identifiers in trigger condition to memory on said WCI and the host system enters the power saving mode if there is no activity on the host system. While the host system powering down, said WCI is still active by drawing very tiny electricity from a power supply, such as battery. Said WCI is monitoring the wireless medium while the host system is in power saving mode. Said WCI listens to the message that transmits on wireless medium. If an identifier was detected in the received message and is one of the identifier in the memory of WCI, said WCI sends a wake up signal to the sleeping host system. Then, said WCI interrupts said application program on host system to provide the detected identifier after host system wakes up.

Therefore, the present invention has lower power consumption and faster proximity detection capability by using the identifier in MAC sublayer or data link layer protocol instead of upper layer protocol. The present invention use the identifier of communication protocol instead of special identifier provide an easy of use approach because the present invention can detect all WCI nearby complied with the same protocol without installing special program in peer side. Hence, it also reduces the system deployment difficulty. The present invention has no impact on other WCI because other WCI don't need to response to the system for detection. The present invention doesn't need to establish a wireless connection such that has no illegal access problem and is fast without connection establishment delay. Without connection requirement, the present invention can be used in an unfamiliar environment where the wireless connection is impossible. The present invention could be used in many applications, for example, a person sensitive reminder, a TO-DO list warning system, automatic login and e-mail retriever, and automatic appliance controller, proximity sensitive file manager, etc.

DRAWING FIGURES

A system and method for mobile devices receiving specifications of a job and execute the job when the presence of one or more identifier of wireless communication interfaces matches the job trigger condition. In the following description, for purpose of explanation, numerous of specific details are set forth in order to provide a thorough understanding of the present invention.

DESCRIPTION

As used herein, a proximity triggered job (hereafter "job") refers to one or more actions that user schedule and to be executed when a computer-processing device (hereafter "computing device") detects the presence of one or more identifiers (hereafter "trigger identifiers") that each identifier designates a wireless communication interface (hereafter "WCI"). For example, said job are sending out a remind message, sending/receiving e-mail, downloading information, sending out control instruction to other devices, such as computers or appliances, trigger other application programs, issue warning message, etc.

The System

Figure 1:
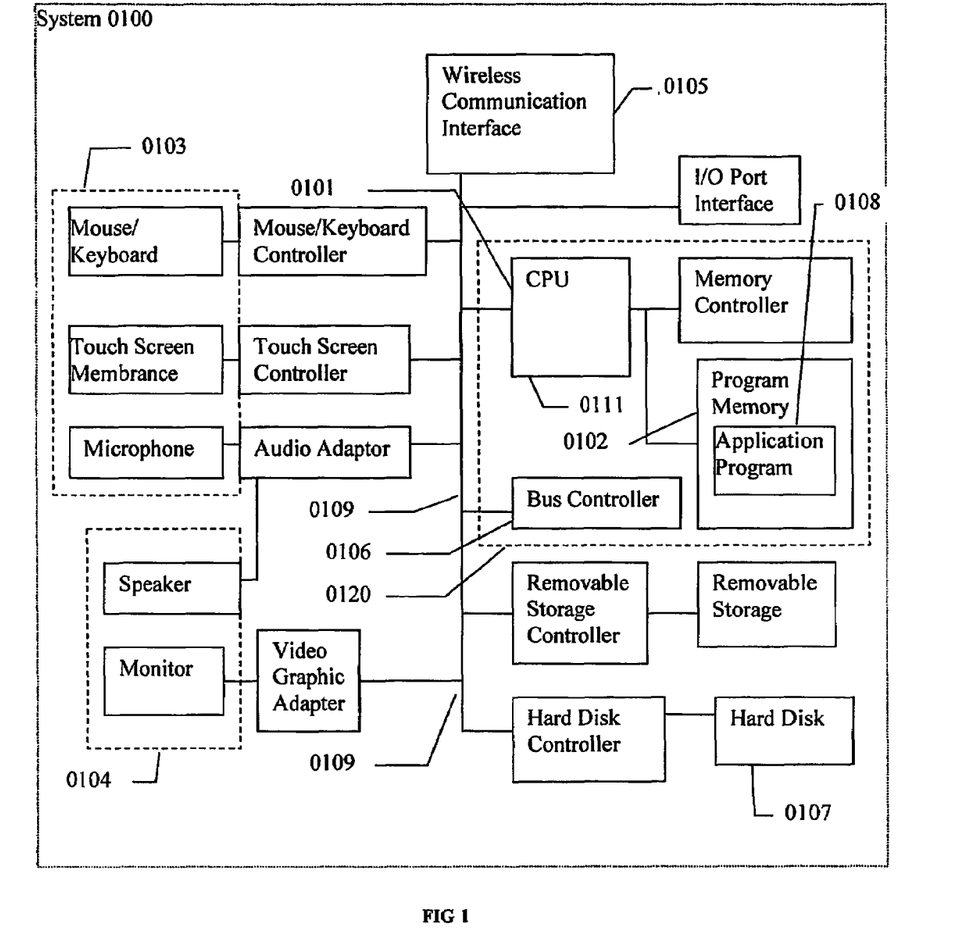
FIG. 1 shows a computing device with a wireless communication interface and other general components for the present invention.

FIG. 1 illustrates an example of said computing device 0100 (hereafter "System") for storing, retrieving, and executing said jobs relating to the presence of one or more WCIs on other computing devices in accordance with some embodiments of the present invention. The System 0100 is generally implemented using any conventional general-purpose computer having conventional computer components, including at least one processor 0101, program memory 0102, one or more input devices 0103, one or more output devices 0104, at least one WCI 0105. In some embodiments, WCI 0105 is an integrated build-in module in System 0100. In some embodiments, the WCI 0105 is an add-on card that connects to the system bus 0109 of the System 0100 via a bus controller, for example PCMICA controller; in yet another embodiment, the WCI 0105 is a stand-alone adapter that is connected to the System 0100 via an I/O port, for example an USB port. The input device may include mouse, keyboard, touch sensitive screen, or voice recognition module. The output device may include monitor, screen, or speaker module. Processor 0101, program memory 0102, system bus 0109, and bus controller are usually considered as host system 0120 and others are peripherals. In some embodiments, System 0100 is a mobile computing device, such as a personal digital assistant (PDA), a mobile telephone or a portable computer, that may omit one or more components found in conventional general-purpose computers, e.g., hard drive 0107 and keyboard. Application program (hereafter "scheduler") 0108 is generally executed in any conventional operating system, such as Windows Pocket PC, manufactured by Microsoft Corporation of Redmond, and Palm, manufactured by Palm, Inc., of Santa Clara, Calif. Application program 0108 is generally programmed in any conventional general-purpose programming language, such as Java, C, and C++, any combination of general-purpose programming languages, or any combination of a general-purpose programming language and a more specialized programming language, such as a scripting language (Perl). In general, any computing device capable of communicating information to another computing device may be used in various embodiments of the present invention.

Wireless Communication Interface

The WCI 0105 may comply with one or more of the variety of network protocols, such as IEEE 802.11b, IEEE 802.11a, Bluetooth, CDMA, GSM, GPRS, RFID, IrData, or UWB, etc. Different wireless communication protocols offer different capabilities and have different operation range. Bluetooth is a wireless personal area network (WPAN) protocol and offers about 10 meter of operation range. IEEE 802.11b protocol is a wireless local area network (WLAN) and offers 100 to 500 meters of operation range. GSM/GPRS protocol is a wireless wide area network (WWAN) and offers one to several miles of operation range between a mobile handset to a base station. The operation range of a wireless communication interface contributes to the capability of detecting the presence of other WCI that complies with the same type of wireless communication protocol.

Figure 2:
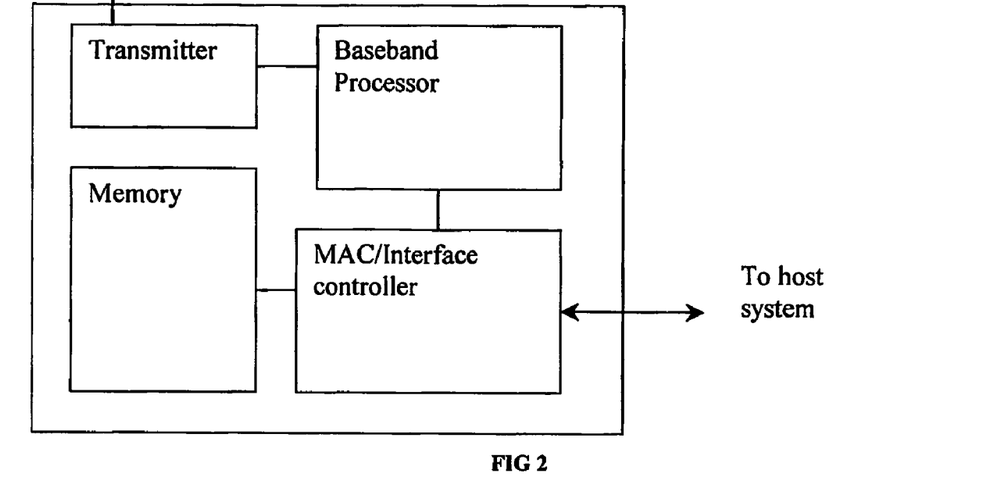
FIG. 2 shows the components in a general wireless communication interfaces.

FIG. 2 illustrates general architecture of WCI that includes a wireless transmitter 0201, a baseband processor 0202, a controller 0203, and a memory 0204. The baseband processor 0202 performs functions of the physical layer protocol stack. The controller 0203 performs functions of Media Access Control sublayer protocol stack and also interfaces to host system 0120. A firmware program for the controller 0203 is stored in memory 0204. The memory 0204 is a random access memory (RAM) or any other rewritable memory. In other embodiment, memory 0204 is a non-volatile rewritable memory, such as Flash Memory, so the data in the memory will not lost even if the receiver is powered off. In yet another embodiment, memory 0204 is an EPROM memory, which in turn needs another rewritable memory or uses the register memory in controller 0203 for storing temporary data.

System 0100 may contain one or more WCIs. For example, Compaq iPAQ™ Pocket PC 3835 with an IEEE 802.11b wireless network card plug-in can detect other IEEE 802.11b compiled devices. For another example, Nokia 6310 is a GSM/GPRS mobile phone handset with build-in Bluetooth interface. Nokia 6310 is able to detect the presence of WCIs complied with either GSM/GPRS or Bluetooth. In some embodiment, system 0100 can extends its detecting capability by query the other computing device nearby. Therefore, system 0100 could detect more WCIs in the same protocol or in different protocol if said other computing device has another WCI in different protocol.

Conventioanl Network Architecture

In general, the communication between communication devices must be precisely defined to ensure correct interpretation of the message, such as the frames or packets, by the receiving parties or nodes. There are many tasks to perform to interpret the message and they are defined by a protocol. To reduce the design complexity, most communication protocols are organized as a series of layers or levels, each built on its predecessor. The active elements in each layer are called entities or node (hereafter "node"). A node can be a software entity, or a hardware entity. Nodes in the same layer on different machines are called peer nodes. For different design purposes, all communication protocols are vary in the number of layers, the contents of each layer, and the function of each layer. Each layer provides service to higher layers and hidden the implementation detail from those layers. Message on layer N of node A need to be processed by protocol layers one by one below it until it reach the lowest layer, transmit through a physical medium to reach node B, and passes up to layer N on node B. Then, the message on layer N of node B can be correctly interpreted as the message on layer N of node A.

Figure 3:
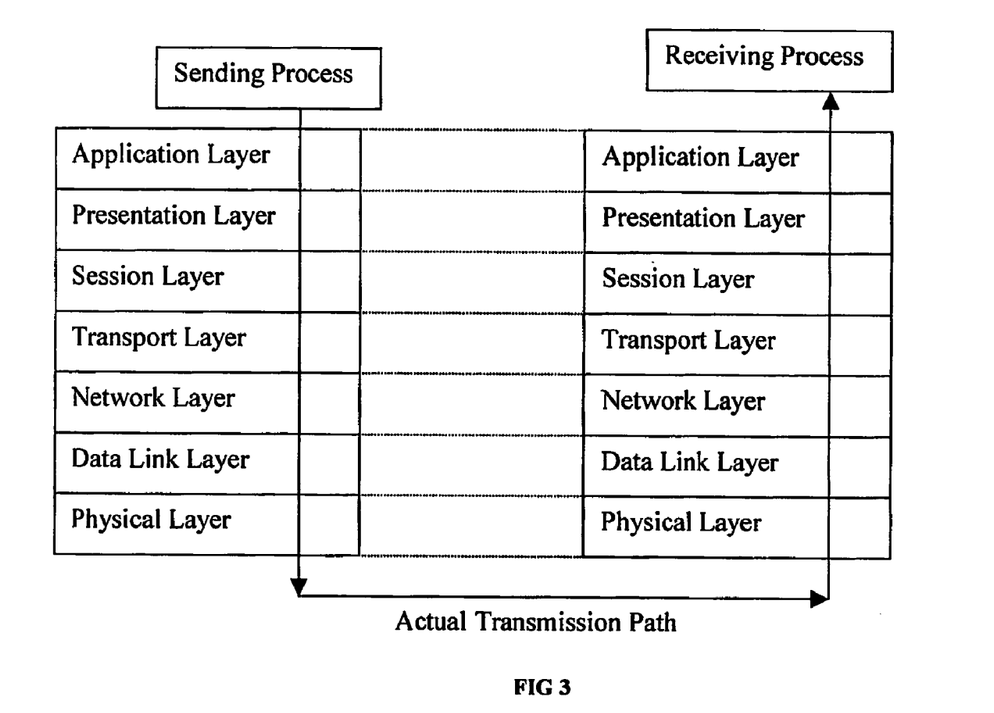
FIG. 3 shows the international network architecture standard, OSI reference model.

FIG. 3 illustrates a well know international network architecture standard, ISO OSI (Open System Interconnection) Reference Model. The layers of the OSI model from bottom up are physical layer, data link layer, network layer, transport layer, session layer, presentation layer, and application layer. The physical layer is concerned with transmitting raw data bits over a communication channel. Typical design issues are electrical, mechanical, and the physical medium. The data link layer provides functional and procedural means to transfer data between network hosts and correct transmission error; provides for activation, maintenance, and deactivation of data link connections, break up message from upper layer into frames, flow control, and media access control, etc. The data link layer usually divides into Media Access Control (MAC) sublayer that interface with physical layer and the Logic Link Control (LLC) sublayer that interface with network layer. MAC sublayer protocol governs access to the transmission medium independent of the physical characteristics of the medium, but taking into account the topological aspects of the network, in order to enable the data exchange between nodes. Two wireless network topologies are ah hoc network and infrastructure network. The network layer provides switching and routing functions to establish, maintain, and terminate network layer connections and transfer data between users. The MAC sublayer and data link layer is the focus of present invention. In MAC sublayer, nodes are sharing the media. Thus each node is given an address to indicate who is the receiver of a message. Most of the MAC sublayer of wireless network protocol implements a carrier sense protocol, for example, Carrier Sense Multiple Access (CSMA), CSMA with Collision Detection (CSMA/CD), etc. The terms used here is for reference, different protocol may call the layers in different terms. For example, "MAC sublayer" is called "Baseband layer" in Bluetooth. The layer should be determined by its functionality instead of by the name.

Detect Other Wireless Communication Interface

Each protocol layer defines a set of frame formats for variety of frames. A frame format comprises a set of fields that occur in a fixed order in all frames. The protocol defined the meaning and usage of each fields in a frame. Typically, each node gets its own unique identifier such as an MAC address. In an infrastructure wireless network, an access point and the set of nodes that are served by said access point forms a service set (SS). The service set of an infrastructure wireless network may also have an identifier, for example SSID in IEEE 802.11 MAC protocol, to distinguish the SSs when multiple access points are nearby. The frame header usually describes the source and/or destination of said frame and may include some control fields. The source usually designates the source node or immediate transmitter node by an identifier such as an address. The destination designates the destination node or immediate receiver node by an identifier such as an address. The destination address can be either unicasting or multicasting. Unicast addresses are used to designate a particular node. Multicasting address is used to designate a group of nodes or all other nodes. For example, frame header of IEEE 802.11 MAC protocol includes BSSID, transmitter address, receiver address, source address, and destination address. For Bluetooth baseband protocol, identifier is the Bluetooth device address (BD_ADDR) or its lower address part (LAP). The identifier can be found in the access code of each received packets or in the BD_ADDR of received FHS packet. The access codes include Channel Access Code (CAC), Device Access Code (DAC), and Inquiry Access Code (IAC). The identifier to be discovered in CAC is the LAP of the master of the piconet. The identifier to be discovered in DAC is the LAP of a slave of the piconet.

For wireless physical media, message is physically broadcast to all the nodes in vicinity. The receiver node of a message is close to the node that transmits the message. Because the immediate destination node is close to the transmitter node, we can expect that the distance between immediate destination node and said receiver node is no more than twice of the operation range of the WCI. Since that, scheduler 0108 intercepts the message on the wireless media by WCI 0105, decodes the message, and retrieves the identifiers according to the MAC sublayer or other layers in data link layer. The nodes that are designated by the retrieved identifiers are close to WCI 0105.

Schedule a Job

To request a job to be executed under certain condition, user needs to provide a job specification. A job specification includes two parts, what to do and when to do. A job description may be described in variety ways in different embodiments, for example in text format, a voice message format, a script language format, or a binary code format. In general, Job description is to specify what should be performed that includes one or more actions. In one embodiment, an action may further be given with zero or more arguments, for example, operation option, content data, input/output instruction, etc. For example, scheduler 0108 has implemented speech synthesis capability and user want to remind himself to buy milk; a trigger condition is "Speak 'Buy milk'", where speak is an action, a command for scheduler 0108, and "Buy milk", is an argument. For another example, the job description is a list of C shell commands in UNIX, "connectAP AP1; mailx John@JohnPC<myMail", where connectAP is an action, a UNIX program, to associate and connect to access point AP1 and mailx is another action, a UNIX program, to send a file, myMail, as e-mail to John at machine called JohnPC. In another embodiment, scheduler 0108 only performs a single action; the action become default and the job description only need to give one or more arguments for said default action. For example, a reminder application, the job description is only a message to be replay when the job is executed.

Job trigger condition is to specify when said job should be executed. There are variety of type of trigger conditions, for example proximity trigger condition, time trigger condition, temperature trigger condition, etc. For example "on Monday" means to execute only on Monday. Although the proximity trigger condition is the main focus of the present invention, it does not exclude the possibility to use other type of trigger condition in said job trigger condition. A proximity trigger condition is the presence of one or more WCIs or SS according to the present invention. However according to previous paragraph, the presence of a WCI or SS is similar to the presence of the identifier that designates the WCI or SS. Therefore, a proximity trigger condition is the presence of one or more identifiers of WCIs or SSs. In one embodiment, the presence condition of an identifier includes two states, "present" and "absent". In another embodiment, the presence condition of an identifier is a time stamp that is when said identifier was last detected. With said time stamp, the presence condition could derive into more states such as "present", "absent", and "lost" depend on a threshold that a user preferred. For example, an identifier is considered "absent" if the elapse time from said time stamp to current is more than 10 minutes. If said elapse time is more than 3 minutes and less than 10 minutes, the identifier is considered "lost". If said elapse time is less than 3 minutes, the identifier is considered "present". For example, execute a job when identifier, a MAC address "00:30:AB:0A:86:61", become present. The trigger condition is "00:30:AB:0A:86:61 [present]". An identifier could have one more aliases, for using a meaningful name to user, and use the alias in the trigger condition. For example, the alias of identifier "00:30:AB:0A:86:61" is "MyHome" and the trigger condition become "MyHome <present>". In one embodiment, "present" is the default state of presence condition such that "MyHome <present>" is equal to "MyHome". In another embodiment, a BOOLEAN condition is used in the trigger condition for defined a condition that related to the presence of multiple identifiers. For example, "MyHome1 or MyHome2" means when either "MyHome1" or "MyHome2" is present. For another example, "AP1 and AP2" means between two access points, AP1 and AP2. A trigger condition could have an alias and reuse the trigger condition in other job specification by reference to said alias. Since the mobility of mobile device, a WCI may not be reliably detected. In yet another embodiment, a majority vote technique is used to solve the problem. It chooses the identifiers of three nearby WCIs and the majority of said identifiers become present will trigger a job execution. In some embodiment, a condition specification may be described in nature language. In some embodiments, the trigger condition is default to one or more identifiers that current present.

In one another embodiment, scheduler 0108 provides an application programming interface (API) to interface with other application for registering a job such as a notification job. Hence, other application could easily utilize the proximity trigger capability of the system 0100.

Job Execution

When a trigger condition of a job matches, the one or more actions are executed. In some embodiment, the action is be handled by system 0100 directly. In some embodiment, the action is for invoke another application let the application perform the action.

Operation Flow

Figure 4:
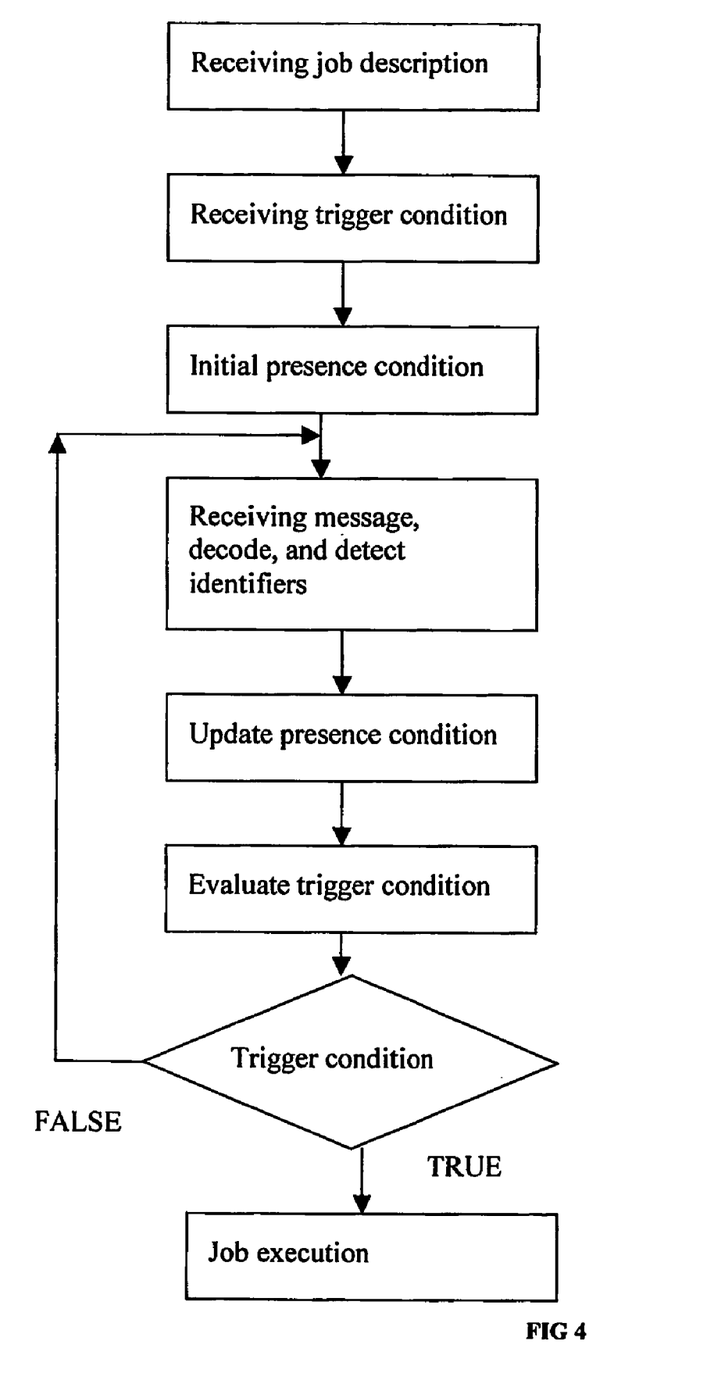
FIG. 4 shows a method of scheduling and executing a job by according to some embodiments.

FIG. 4 illustrates the flow of scheduling and executing a job by the System 0100, according to some embodiments of the present invention. The process starts from stage 0401. In stage 0401, System 0100 receives a job description. The job description includes one or more actions. Each action is given with zero or more arguments.

In stage 0402, System 0100 receives a trigger condition that specifies when said job should be executed. Said trigger condition is a relation of presence conditions of one or more identifiers of MAC sublayer or data link layer of wireless communication network. Therefore, the identifiers referred by said trigger condition is called trigger identifiers.

In stage 0403, initial the presence condition of each trigger identifier. For example, set the presence of a trigger identifier to "present" if said identifier is just found in previous received MAC or data link frame. Otherwise, set the presence to absent.

In stage 0404, receive message from wireless media by a receiver and process said message by physical layer of said wireless communication protocol to identify a frame. Pass said frame to MAC sub layer or data link layer of said wireless communication protocol and decode said frame. One or more identifiers are then decoded from said frame. Therefore, said one or more identifiers are called detected identifiers and their presences are present.

In stage 0405, update the presence of trigger identifiers. If a trigger identifier is also a detected identifier, set the presence of the trigger identifier to present.

In stage 0406, evaluate the trigger condition. If the presences of trigger identifiers match with the trigger condition, go to stage 0407. Otherwise, go back to stage 0404.

In stage 0407, executing said job.

Polling Scheme

In some embodiments, scheduler 0108 is implemented as software that is performed on processor 0101 and periodically polls the WCI 0105 to receive a frame from wireless media. Scheduler 0108 performs the identifier detection function by decoding fields of said frame. Scheduler 0108 then updates the presences of trigger identifiers that are trigger identifiers. Scheduler 0108 evaluates trigger condition with the latest presences of trigger identifiers. Since that, process 0101 needs to be powered up to perform identifier detection function even if there is only small fraction of message on the wireless media contains the identifiers interested to scheduler 0108. Therefore, an interrupt scheme is considered in the following embodiment to reduce the power consumption, which is a major concern in mobile computing environment.

Interrupting Scheme

In some embodiments, system 0100 that adopts the interrupt scheme by moving the identifier detection function from scheduler 0108 to WCI 0105. Scheduler 0108 first registers an interrupt service routine with operation system and WCI 0105 interrupts scheduler 0108 by calling said service routing when there is any trigger identifier is also a detected identifier. Scheduler 0108 then access to WCI 0105 to retrieve the detected identifiers and update the presence of trigger identifiers. In another embodiment, the detected identifiers are transfer to scheduler 0108 during the interrupt service routine. After receiving detected identifiers, scheduler 0108 evaluates the trigger condition and execute the job if trigger condition match. Therefore, the activities and power consumption on process 0101 or scheduler 0108 is reduced to minimum.

Power Saving Mode

Figure 5:
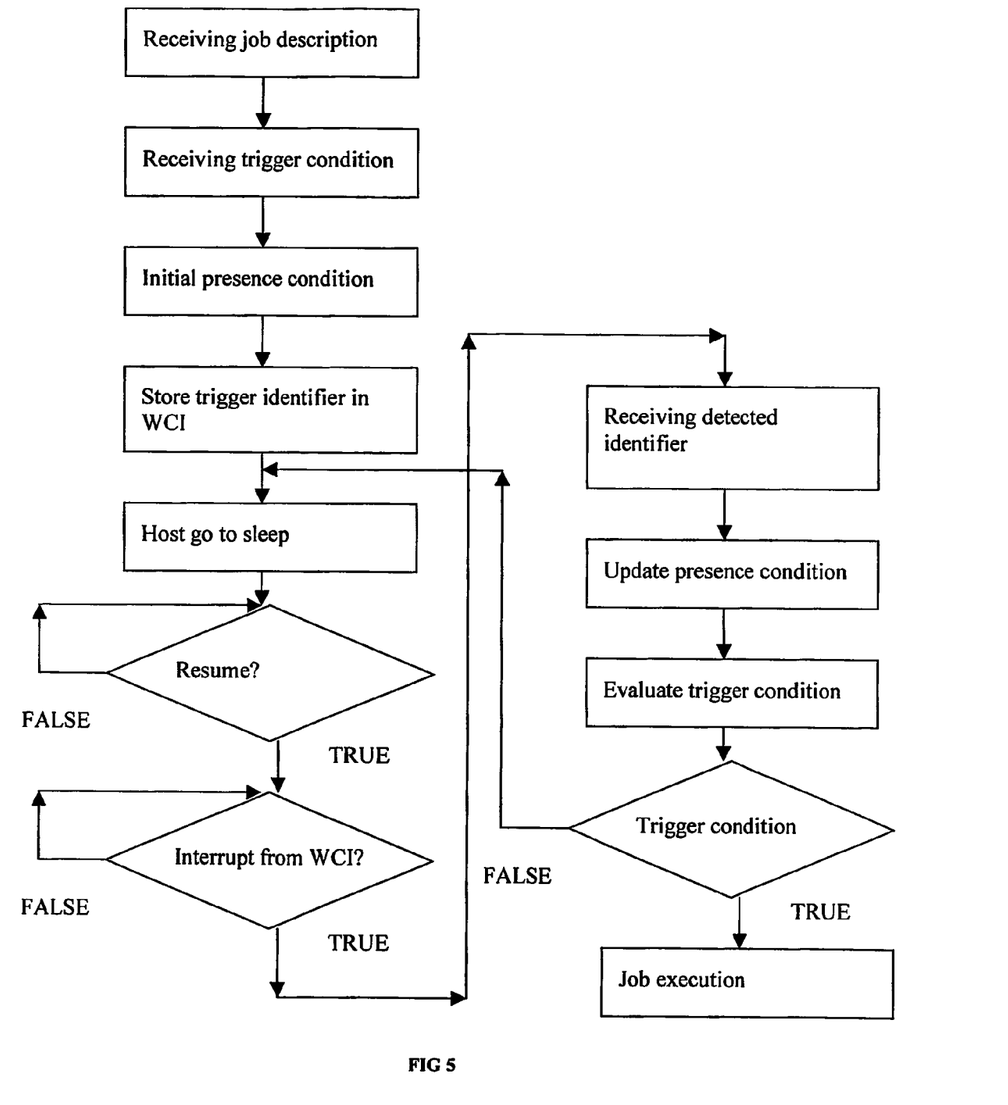
FIG. 5 shows a method of power saving identifier detection.

In some embodiments, the host system 0100 and WCI 0105 are in different power domains and can be power down independently. Said trigger identifiers are stored in memory 0204 of WCI 0105. The host system enters power saving mode manually or automatically if there is no activity on host system 0120 and WCI 0105 keeps power up for performing the identifier detection function. If a detected identifier is one of said stored trigger identifiers in memory 0204 and the host system 0120 is in power saving mode, the WCI 0105 wakes up the host system 0120. The technique to wake up a computer system is well known to those skilled in the art Scheduler 0108 is automatically executed and retrieves the detected identifier from WCI 0105 when host system waked up. FIG. 5 shows the method of power saving scheme of the present invention. In other embodiment, WCI 0105 interrupts scheduler 0108 and delivers the detected identifier to scheduler 0108 after waking up the host system. In another embodiment, the presence condition of said stored identifiers is also stored in memory 0204. Therefore, WCI 0105 only wakes up host system 0120 and interrupt scheduler 0108 when the presence of a stored trigger identifier changed. In yet another embodiment, trigger conditions and an associated job IDs are further stored in memory 0204. Therefore, said WCI 0105 further performs the trigger condition evaluation. If a trigger condition is true, the associated job ID is sent to scheduler 0108 by said interrupt mechanism. In yet another embodiment, the last update time stamp is stored in memory 0204 for each stored trigger identifier as described previously.

Other Applications

The present invention can be implemented in a special application to handle a single type of jobs. The present invention could also implement as a general platform for other application to use it as a proximity notification system. For example, the applications are a person sensitive reminder, a TO-DO list warning system, automatic login and e-mail retrieval, and automatic appliance controller, proximity sensitive file manager, etc.

Figure 6:
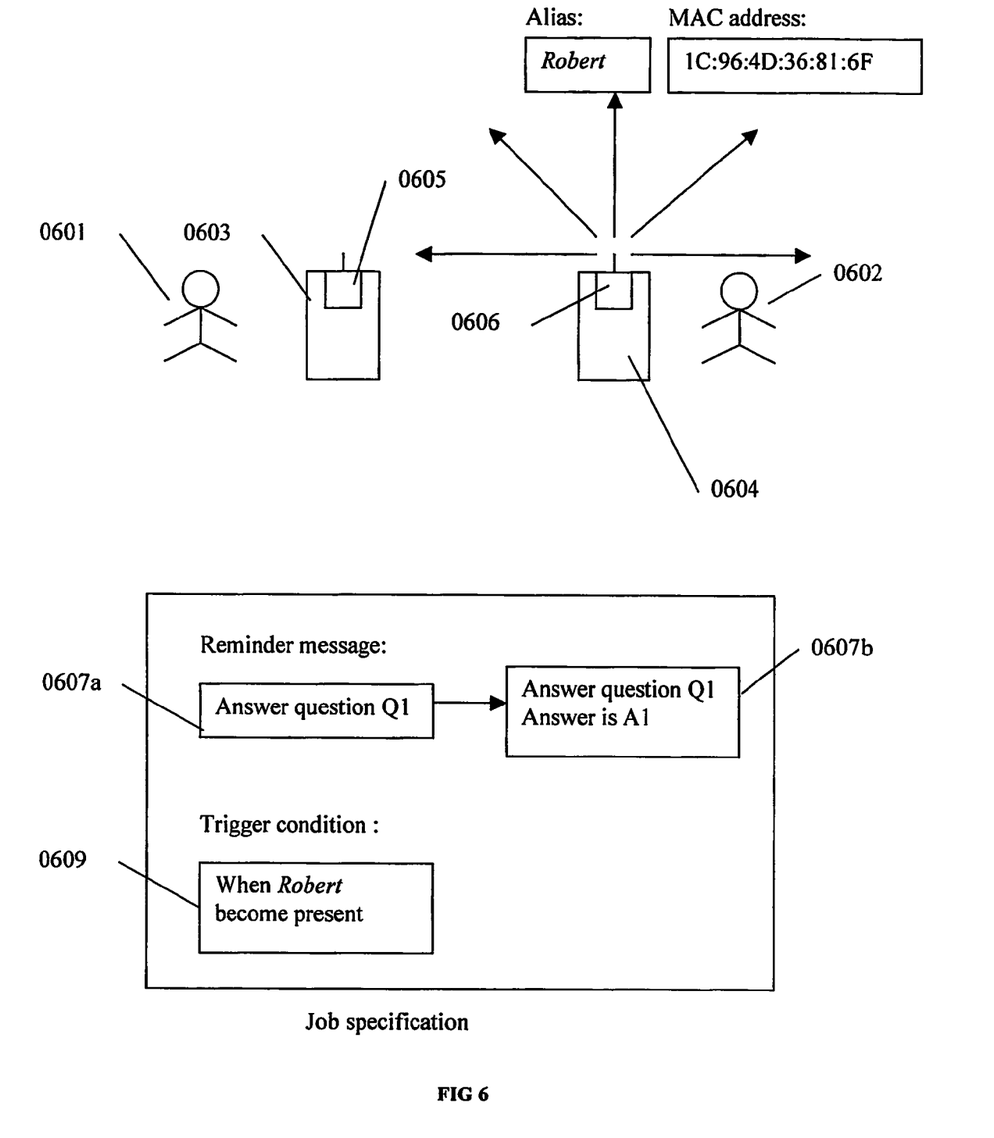
FIG. 6 shows a person sensitive reminder application of the present invention.

FIG. 6 illustrates a person sensitive reminder application that user 0601 of the present invention meets his customer 0602. User 0601 carries a computing device 0603 that implements System 0100 and his customer 0602 carries a computing device 0604. Both the WCI 0605 on computing device 0603 and the WCI 0606 on computing device 0604 complied with Bluetooth protocol. His customer 0602 asks user 0601 to answer a financial question Q1 when they meet next time. User 0601 schedules an alert to remind him when they meet again. User quickly schedules an alert job and the message 0607 is "Answer the question Q1". Initially, user needs to know identifier of WCI 0606 for setting up a job. Thus, while creating the job, System 0100 on computing device 0603 sends out a query to detect identifies of other nearby Bluetooth devices. System 0100 detects the identifier 0608 of the WCI 0606. Then, user 0601 confirms the identifier 0608 with his customer and chooses the identifier 0608 for WCI 0606, and assigns identifier 0608 an alias "Robert", which is his customer's name. User 0601 describes the trigger condition 0609 as "When Robert become present". User 0601 then goes back to find the answer for question Q1 and amend the message 0607 as "Answer question Q1 and answer is A1". Some days later, the system 0100 on computing device 0603 automatically detects identifier 0608. User 0601 sees his computing device 0603 pops up a alert first and then see his customer 0602 is printing a document from computing device 0604 to a Bluetooth printer.

Figure 7:
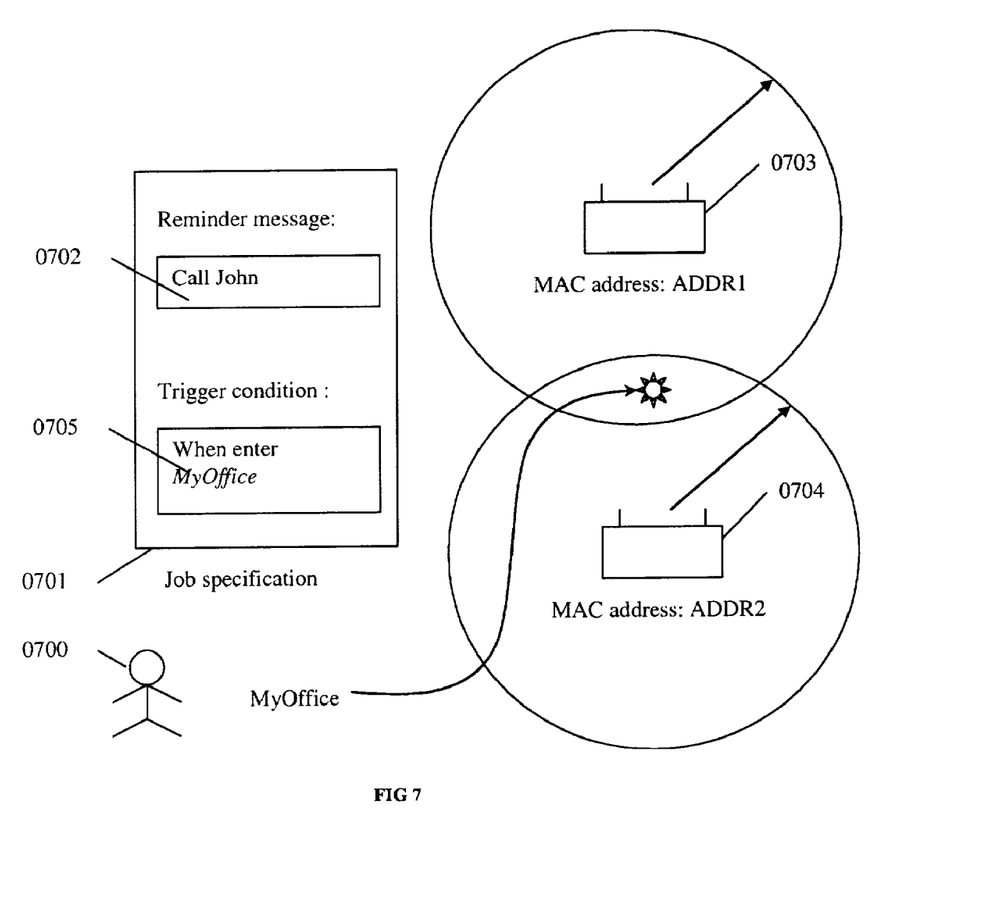
FIG. 7 shows a location sensitive reminder application of the present invention.

FIG. 7 illustrates a location sensitive reminder application that user 0700 would like to give John a phone call when he arrive his office the next day, Feb. 8, 2002. User 0700 has a PDA that implements System 0100. User 0700 schedules a reminder job 0701 on System 0100 and input a reminder message 0702, "Call John". System 0100 detects two access points, AP0703 and AP0704, and their MAC addresses, ADDR1 and ADDR2. ADDR1 and ADDR2 are used as identifiers for the access points. User 0700 creates a trigger condition "ADDR1 and ADDR2" and assigns an alias, "MyOffice". Then, user 0700 defines a trigger condition 0705, "When enter MyOffice on Feb. 8, 2002", where "enter" means when condition "MyOffice" becomes true. When user 0700 comes in the next day, System 0100 on his PDA automatically detects ADDR1 and ADDR2 identifiers because the MAC addresses are broadcasted from two access points. Scheduler 0108 on System 0100 then retrieves the reminder job of which the proximity condition and the time condition is satisfied too. System 0100 then executes the job by speaking out the message with the speaker on the PDA. Then, user 0700 calls John.

Figure 8:
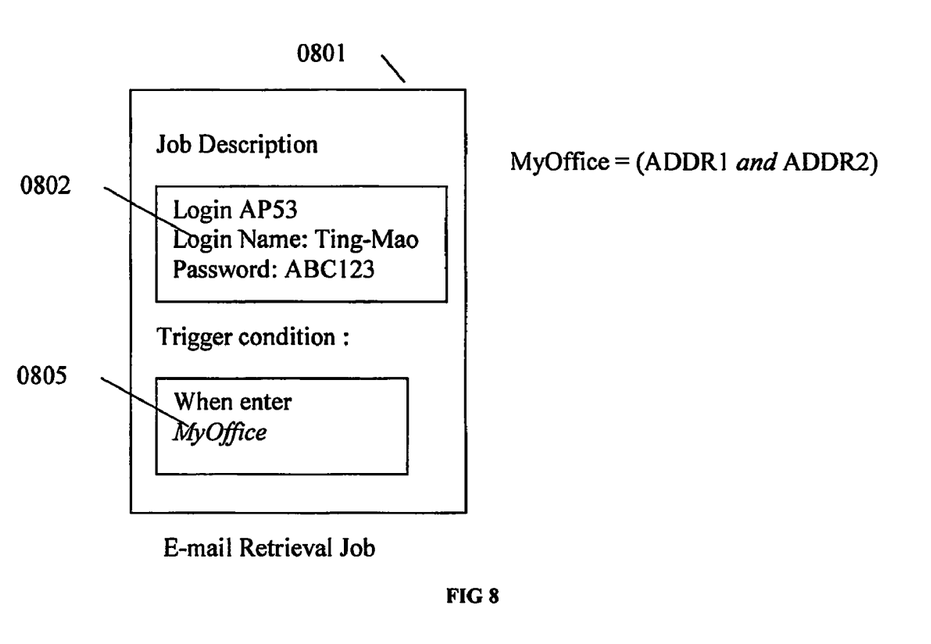
FIG. 8 shows an automatic connection and e-mail retrieval application of the present invention.

FIG. 8 shows an automatic connect and e-mail retrieval application that, during the lunchtime at a restaurant, user 0700 wants to remind him to check for e-mail when he goes back to office. User 0700 schedules an e-mail retrieval job 0801 and chooses the access point AP0703 to access the company network. Then, user 0700 defines a trigger condition 0802, "When enter MyOftice". System 0100 understands that "MyOffice" means "ADDR1 and ADDR2", which is stored by System 0100 in a memory. When user 0700 goes back to office, scheduler 0108 on System 0100 retrieves the job 0801 and finds the trigger condition is satisfied. An e-mail retrieval program in System 0100 then login to the company network through the access point AP0703. If there is incoming e-mail, the e-mail retrieval program will notify user by a special sound or displayed on the screen. The abstract of the disclosure is included and is now present in a separate sheet, apart from any other text. The following change in specification indicates the page number and line number in original specification.

Figure 9:
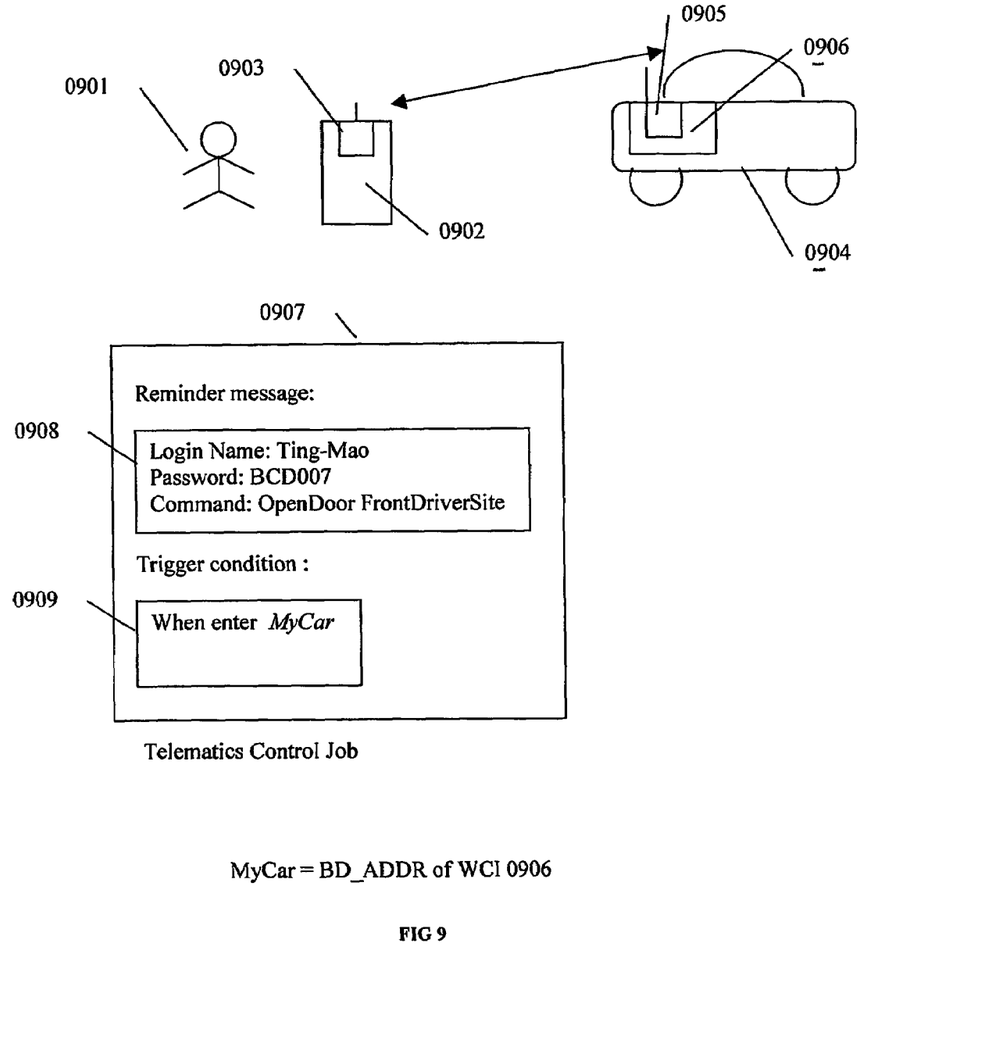
FIG. 9 shows an automatic appliance controller application of the present invention.

FIG. 9 illustrates an appliance controller application that user 0901 can automatically control some devices when approaching the devices, for example to unlock his car when he come to his car and to automatically open the garage door when he arrived home. User 0901 carries a PDA 0902 that has the WCI 0903 complied with both IEEE 802.11b and Bluetooth communication protocols. His car 0904 has an in-vehicle computer 0905 that is a telematics system and has a Bluetooth WCI 0906, which has a BD_ADDR, "01:A0:29:3F:B4:8D", as identifier and the alias is, "MyCar". The WCI 0906 acts as a Bluetooth master of the piconet that periodically searches for nearby devices and establishes connections with a host controller interface (HCI) RS232 layer. User 0901 creates and schedules job 0907 in System 0100 that is installed on PDA 72. A job specification 0908 of job 0907 is "Login computer 0905, OpenDoor FrontDriverSide", which logs into computer 0905 and issues an instruction to the computer 0905. The "OpenDoor" is a command to the in-vehicle computer 75 and "FrontDriverSide" is the argument of the command. The trigger condition 0909 of job 0907 is "When MyCar become present". When user 0901 gets close to his car 0904, the WCI 0903 detects the WCI 0906, the System 0100 on PDA 0902 finds trigger condition 0909 is true. Scheduler 0101 find job 0907 and execute it by another application, which establishes a Bluetooth connection and logins computer 0905 by and instruct computer 0905 to open driver side front door. After receiving the open door instruction, the in-vehicle computer 0905 instantly opens the driver side front door of car 0904.

An proximity sensitive file manager is a file manager that is sensitive to proximity context. Typical file manager, such as Window Explorer by Microsoft Company, let user browse the files in a file system. Each file name has a file extension. Each type of file extension can associate with an application program. File manager automatically invoke the application that associates with the extension of a file to view or process the file when user is using a mouse to double click on the file. Files in the proximity sensitive file manager are given an extra attribute, proximity trigger condition. When the trigger condition of a file is true, an associated application is invoked to process the file. For example, user can assign a trigger condition, "ConferenceRoom" to a Microsoft PowerPoint file, Marketing.ppt, before leaving for a meeting. "ConferenceRoot" is an alias of MAC address of an access point in conference room. When user arrive conference, proximity sensitive file manager detects "ConferrenceRoot" and bring up Microsoft PowerPoint with the Marketing.ppt file automatically.

CONCLUSION, RAMIFICATIONS, AND SCOPE

The present invention automatically schedules jobs in response to user's request and smartly executes jobs when the presences of one or more identifiers of MAC sublayer or data link layer of wireless communication interfaces matches the user requested condition. The user of the present invention can request to perform different tasks, such as trigger a alarm message, exchange e-mail with mail server, retrieve meeting material from a file server, browse a web page, control a equipment or device, etc.

Although the description above contains many specific details, these should not be construed as limiting the scope of the invention but as merely providing illustrations of some the possible embodiments of the invention.

Thus, the scope of the invention should be determined by the appended claims and their legal equivalents, rather than by the examples given.

I claim:

1. A method for scheduling a proximity triggered job with a mobile computing device, the method comprising:
    coupling said job with at least one trigger condition that is at least determined by a relation between the presences of multiple pre-selected peer wireless communication nodes or access points;
    receiving multiple frames or packets by a wireless communication interface from wireless media, wherein said multiple frames or packets complying with a wireless communication protocol;
    determining the individual presences of said multiple pre-selected peer wireless communication nodes or access points by detecting their identifiers in said multiple frames or packets individually, wherein said identifiers pertain to said wireless communication protocol;
    evaluating said trigger condition according to said individual presences; and
    executing said job in responsive to the determination of said evaluation of said trigger condition.

2. The method of claim 1, wherein said individual presence of each pre-selected peer wireless communication node or access point is further based on the information relating to the elapse time since the last detection of its identifier.

3. The method of claim 1, wherein said identifiers are one or more identifiers selected from the following group consisting of
   a Media Access Control address;
   a BSSID or SSID of IEEE 802.11 protocol; and
   a BD_ADDR or LAP of Bluetooth protocol.

4. The method of claim 1, wherein said relation is a Boolean equation of presences of said multiple pre-selected peer wireless communication nodes or access points or a constraint on the number of said pre-selected peer wireless communication nodes or access points that are present.

5. The method of claim 4, wherein said number means the majority of said multiple pre-selected peer wireless communication nodes or access points.

6. The method of claim 1, wherein said job performs one or more tasks selected from the following group consisting of
   replaying a pre-selected message;
   transferring data from or to a pre-selected location in a computer network through any nearby peer wireless communication node or access point;
   login into another computer system by given a login name and password;
   instructing another computer system to perform certain task; and
   invoking an application to process a file based on the file type.

7. The method of claim 1, wherein said identifiers pertain to physical link or media access control of said wireless communication protocol.

8. A mobile system for scheduling proximity triggered job, the system comprising:
   at least one wireless communication interface for receiving multiple frames or packets complying with a wireless communication protocol;
   storage for information relating to at least one trigger condition, wherein said trigger condition is at least determined by a relation between the presences of multiple pre-selected peer wireless communication nodes or access points and the condition is coupled to said job;
   a detector for determining the individual presences of said multiple peer wireless communication nodes or access points by detecting their identifiers in said multiple frames or packets individually, wherein said identifiers pertain to said wireless communication protocol;
   a matcher for evaluating said trigger condition according to said individual presences; and
   a processor for executing said job in responsive to the determination of said matcher.

9. The system of claim 8, wherein said individual presence of each pre-selected peer wireless communication node or access point is further determined by the information relating to the elapse time since the last detection of its identifier.

10. The system of claim 8, wherein said identifiers are one or more identifiers selected from the following group consisting of
    a Media Access Control address;
    a BSSID or SSID of IEEE 802.11 protocol; and
    a BD_ADDR or LAP of Bluetooth protocol.

11. The system of claim 8, wherein said relation is a Boolean equation of presences of said multiple pre-selected peer wireless communication nodes or access points or a constraint on the number of said pre-selected peer wireless communication nodes or access points that are present.

12. The system of claim 11, wherein said number means the majority of said multiple pre-selected peer wireless communication nodes or access points.

13. The system of claim 8, wherein said job performs one or more tasks selected from the following group consisting of
    replaying a pre-selected message;
    transferring data from or to a pre-selected location in a computer network through any nearby peer wireless communication node or access point;
    login into another computer system by given a login name and password;
    instructing another computer system to perform certain task; and
    invoking an application to process a file based on the file type.

14. The system of claim 8, wherein said identifiers pertain to physical link or media access control of said wireless communication protocol.

15. A method for a mobile computing device to interact with a user, the method comprising:
    selecting by user a trigger condition that is at least determined by the state of presence of a pre-selected peer wireless communication node or access point;
    coupling at least one job to said trigger condition;
    receiving messages by a wireless communication interface from wireless media, wherein said messages complying with a wireless communication protocol;
    detecting the identifier of said pre-selected peer wireless communication node or access point in one or more identifier fields pertaining to said wireless communication protocol in said messages;
    evaluating said trigger condition, including determining said state of presence of said peer wireless communication node or access point at least in part based on information relating to the elapse time since the last detection of said identifier; and
    executing said job in responsive to the determination of said evaluation of said trigger condition.

16. The method of claim 15, wherein said trigger condition is at least determined by lost of detection of said pre-selected peer wireless communication node or access point.

17. The method of claim 15, wherein said identifiers are one or more identifiers selected from the following group consisting of
    a Media Access Control address;
    a BSSID or SSID of IEEE 802.11 protocol; and
    a BD_ADDR or LAP of Bluetooth protocol.

18. The method of claim 15, wherein said job performs one or more tasks selected from the following group consisting of
    replaying a pre-selected message;
    transferring data from or to a pre-selected location in a computer network through any nearby peer wireless communication node or access point;
    login into another computer system by given a login name and password;
    instructing another computer system to perform certain task; and
    invoking an application to process a file based on the file type.

19. The method of claim 15, wherein said one or more identifier fields pertain to physical link or media access control of said wireless communication protocol.

20. A system for interacting with user, the system comprising:
- at least one wireless communication interface for receiving messages complying with a wireless communication protocol;
- an input device for assigning at least one trigger condition selected by user, wherein said trigger condition is at least determined by the state of presence of a pre-selected peer wireless communication node or access point and the condition couples to at least one job;
- a detector for detecting the identifier of said peer wireless communication node or a access point in one or more identifier fields pertaining to said wireless communication protocol in said messages;
- a matcher for evaluating said trigger condition, including determining said state of presence of said peer wireless communication node or access point at least in part based on information relating to the elapse time since the last detection of said identifier; and
- a processor for executing said job in responsive to the determination of said matcher.

21. The system of claim 20, wherein said trigger condition is at least determined by lost of detection of said pre-selected peer wireless communication node or access point.

22. The system of claim 20, wherein said identifiers are one or more identifiers selected from the following group consisting of
- a Media Access Control address;
- a BSSID or SSID of IEEE 802.11 protocol; and
- a BD_ADDR or LAP of Bluetooth protocol.

23. The system of claim 20, wherein said job performs one or more tasks selected from the following group consisting of
- replaying a pre-selected message;
- transferring data from or to a pre-selected location in a computer network through any nearby peer wireless communication node or access point;
- login into another computer system by given a login name and password;
- instructing another computer system to perform certain task; and
- invoking an application to process a file based on the file type.

24. The system of claim 20, wherein said one or more identifier fields pertain to physical link or media access control of said wireless communication protocol.

25. A method for scheduling a proximity triggered job with a wireless computing device, the method comprising:
- coupling said job with at least one trigger condition that is at least determined by a relation between the presences of multiple pre-selected peer wireless communication nodes or access points that are in the vicinity of a location;
- receiving messages by a wireless communication interface of said device from wireless media, wherein said messages complying with a wireless communication protocol;
- determining the presence of each said pre-selected peer wireless communication node or access point by detecting its identifier in said messages, wherein said identifier pertain to said wireless communication protocol;
- evaluating said trigger condition; and
- executing said job in responsive to the determination of said evaluation of said trigger condition.

26. The method of claim 25, wherein said identifier pertain to physical link or media access control in said wireless communication protocol.

27. The method of claim 25, wherein said identifier is selected from one of the following group consisting of
- a Media Access Control address;
- a BSSID or SSID of IEEE 802.11 protocol; and
- a BD_ADDR or LAP of Bluetooth protocol.

* * * * *